United States Patent
Klee et al.

(10) Patent No.: US 9,575,658 B2
(45) Date of Patent: Feb. 21, 2017

(54) COLLABORATIVE RELEASE OF A VIRTUAL DISK

(71) Applicant: VMware, Inc., Palo Alto, CA (US)

(72) Inventors: Christoph Klee, Snoqualmie, WA (US); Adrian Drzewiecki, Mountain View, CA (US); Jesse Pool, Sunnyvale, CA (US); Nishant Yadav, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 49 days.

(21) Appl. No.: 14/656,152

(22) Filed: Mar. 12, 2015

(65) Prior Publication Data

US 2016/0266800 A1    Sep. 15, 2016

(51) Int. Cl.
*G06F 12/00* (2006.01)
*G06F 3/06* (2006.01)
*G06F 17/30* (2006.01)

(52) U.S. Cl.
CPC .......... *G06F 3/0604* (2013.01); *G06F 3/0659* (2013.01); *G06F 3/0664* (2013.01); *G06F 3/0673* (2013.01); *G06F 17/30171* (2013.01); *G06F 17/30233* (2013.01)

(58) Field of Classification Search
CPC .... G06F 3/0604; G06F 3/0659; G06F 3/0664; G06F 3/0673; G06F 17/30171; G06F 17/30233
See application file for complete search history.

(56) References Cited

U.S. PATENT DOCUMENTS

2005/0268106 A1* 12/2005 Mansell ................ G06F 13/24
    713/182
2011/0055274 A1* 3/2011 Scales .............. G06F 17/30067
    707/781

* cited by examiner

*Primary Examiner* — Larry MacKall
(74) *Attorney, Agent, or Firm* — Patterson & Sheridan LLP

(57) ABSTRACT

A method for opening a virtual disk comprises reading information from a metadata file that identifies the current owner of the virtual disk. The method further includes sending a release request to the current owner of the virtual disk to release the virtual disk, writing information to the metadata file identifying the new owner, and then opening the virtual disk.

18 Claims, 3 Drawing Sheets

COLLABORATIVE RELEASE OF A VIRTUAL DISK

BACKGROUND

In most operating systems, a file can be exclusively locked by an application or a host. If a second application tries to access the file, the second application will not be able to do so. Similarly, in virtualized environments, only a single user is able to access a virtual disk (VMDK) at any one time to ensure consistency of the data on the virtual disk. For example, a virtual disk may be exclusively locked by the single user and accesses to the virtual disk may be orchestrated by a virtual machine management module.

There may, however, be instances where the virtual disk may be opened without the knowledge of the virtual machine management module. In virtual environments employing input-output (IO) filters, a background thread (or a daemon) can access and exclusively lock a virtual disk without coordinating this action through the virtual machine management module. As a consequence, virtual machine management module operations related to opening a virtual disk would fail without a solution to unlock the disk. As one example, after a virtual machine (VM) crashes, a daemon may access the virtual disk associated with the virtual machine to perform IO operations, thereby locking the disk. When an attempt is made by the virtual machine management module to power on the VM, the attempt fails because the virtual disk is locked and there is no existing solution for the virtual machine management module to unlock the disk. For some automated solutions, a virtual machine management module that manages virtualized environments does not expect that a virtual disk will be locked, and virtual machine management module operations would fail without a clear resolution of how to find the user that has locked the virtual disk and how to ask the user to release the virtual disk.

DETAILED DESCRIPTION

Figure 1:
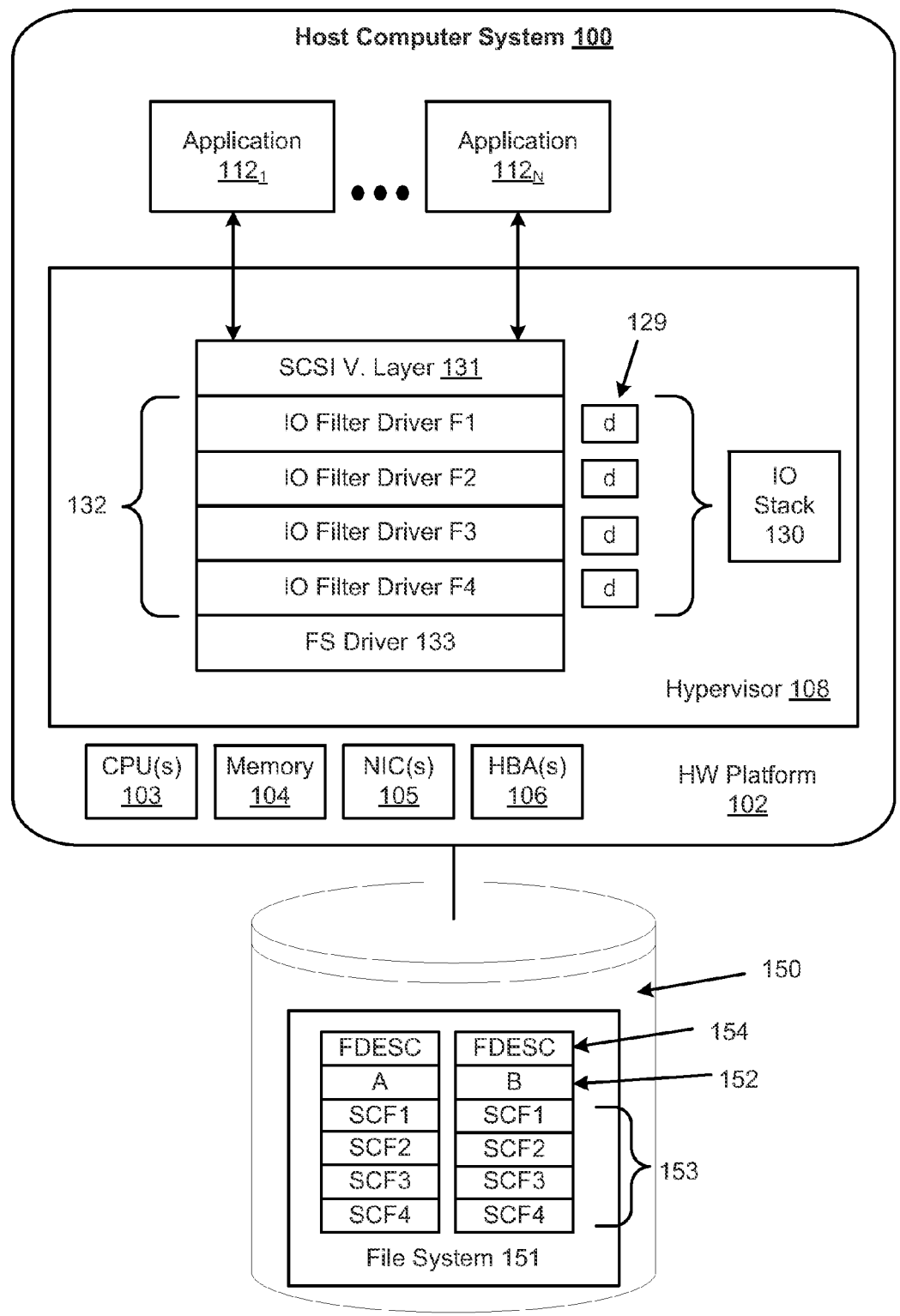
FIG. 1 is a computer system having an operating system that employs metadata files associated with a virtual disk.

A virtual disk for a VM may consist of a collection of files stored on an underlying file system. For example, the virtual disk may contain a metadata file, referred to herein as the "descriptor file," and at least one data file, referred to herein as the "extent file." The extent file stores the virtual disk's data, which is accessible to the VM. The descriptor file contains metadata accessible to the host's core virtualization stack for management of the extent file. For example, the descriptor file points to one or more extent files to indicate which extent files belong to the virtual disk and to provide the layout of a virtual disk. The descriptor and extent files for a virtual disk are migrated, cloned, and otherwise copied together.

Virtual disk filters are plug-ins/pluggable code modules that are able to intercept and, if applicable, modify VM requests directed to corresponding virtual disks owned by the VMs. In doing so, these filters may use and/or create data/metadata that needs to be stored. Filter data shouldn't be simply stored in a global location because it must be able to be easily migrated, cloned, and otherwise copied along with the virtual disk. Virtual disk I/O filters, however, may create too much data/metadata to be stored in the descriptor file. For example, a filter may require many megabytes or even gigabytes of storage space (e.g., for caching or storage of hashes), but a typical descriptor file is very small, on the order of a few kilobytes. Ballooning the size of the descriptor file to accommodate I/O filter data would severely impact performance and maintainability of the virtual disk. Additionally, such metadata should not be stored in the extent file, which may be limited to the VM's data.

The I/O filter framework allows for each plug-in to own one or more metadata files (sometimes known as sidecar files) on a file system associated with the corresponding virtual disk. As described above, a virtual disk includes descriptor and extent files. A sidecar file is separate from the descriptor and extent files and the framework tracks the sidecar file using an entry in the disk's descriptor file. The framework presents an application programming interface (API) to plug-ins for creating or otherwise accessing sidecar files. The API further allows for discovery, migration, cloning, creating a snapshot, and other management of sidecar files, e.g., in response to the migration, cloning, creating a snapshot, or other management event for a corresponding virtual disk.

According to embodiments, the metadata file (sidecar file) is stored alongside a virtual disk. The metadata file is separate from a file descriptor (e.g., an inode) and stores information about the current owner of a disk that allows other applications to request that the disk be released. To gain access to a locked virtual disk, applications extract information about the current owner of a virtual disk from its associated metadata file, and then send a request to the current owner of the virtual disk to close the virtual disk. In response, the current owner writes the new owner information into the metadata file and then closes the disk. Upon receiving notification that the virtual disk has been released for its use, the new owner opens the virtual disk.

FIG. 1 is a computer system, shown as host computer system 100, having virtualization software, referred to herein as hypervisor 108. Host computer system 100 may be constructed on a conventional, typically server-class, hardware platform 102, and includes one or more central processing units (CPUs) 103, system memory 104, one or more network interface controllers (NICs) 105 that connect host computer 100 to a network, and one or more host bus adapters (HBAs) 106 that connect host computer 102 to a persistent storage unit, illustrated herein as storage device 150. Persistent storage may be provided locally in host computer 100 or through the network by a networked-attached storage device.

As further shown in FIG. 1, hypervisor 108 is installed on top of hardware platform 102 and supports the execution of applications $112_1$-$112_N$. Applications $112_1$-$112_N$ may comprise any number of N virtual machines. These virtual machines may each have an associated virtual disk provisioned in storage device 150 such as virtual disks 152. Input-output operations (IOs) issued by the VMs are processed through IO stack 130 of hypervisor 108.

At the top of IO stack 130 is a SCSI virtualization layer 131, which receives IOs from the VMs and targeting the issuing VM's virtual disk and translates them into IOs directed at one or more files managed by hypervisor 108, e.g., virtual disk files representing the issuing VM's virtual disk.

Hypervisor 108 employs filter drivers 132 that are external to a file system driver 133 of the hypervisor (e.g., virtual machine file system (VMFS) driver) to provide various IO filter functions, such as encryption, compression, caching (e.g., write-back caching), antivirus, and others. Filter drivers 132 examine the translated IOs from SCSI virtualization layer 131 and intercept read/write command and data for processing in various filters, such as encryption or compression filters. Filter drivers 132, illustrated here as F1, F2, F3, and F4, can each have an associated daemon 129 as illustrated. Each daemon 129 for an associated filter performs background tasks that may require the virtual disk to be locked. For example, the daemon for the caching filter will need to lock the virtual disk when performing de-staging operations.

The remaining layers of IO stack 130 are additional layers managed by hypervisor 108. FS driver 133 receives the IOs passed through filter drivers 132 and translates them to block IOs issued to one or more logical volumes that are provisioned in file system (VMFS) 151.

As illustrated in FIG. 1, each filter has an associated metadata file 153. The metadata files 153 (illustrated as SCF1-SCF4 for each disk) are stored alongside and associated with the virtual disks 152. The virtual disk labeled "A" in FIG. 1 may be a virtual disk associated with VM$_1$ (i.e., VM1.VMDK). The virtual disk labeled "B" may be a virtual disk associated with another VM, such as VM$_2$ (i.e. VM2.VMDK). In addition to metadata files 153, file descriptors 154 are stored alongside and associated with virtual disks 152.

Not all IO filters are attached to virtual disks. When an IO filter is attached to a virtual disk, metadata file 153 is created for that virtual disk for purposes of storing data required to perform the functions of the IO filter. One type of information that a metadata file 153 stores is current owner information for a virtual disk. In some embodiments, metadata files 153 may note in the ownership filed that an ownership transfer to a new owner is pending, so that another party will not try to acquire ownership of the virtual disk before the new owner. These metadata files 153 can be opened, read, and closed by the associated daemon and applications to determine ownership of the virtual disk. Once an owner is determined, a request can be sent to the owner to close the virtual disk, as discussed in further detail below.

The various terms, layers and categorizations used to describe the components in FIG. 1 may be referred to differently without departing from their functionality or the spirit or scope of the invention.

Figure 2:
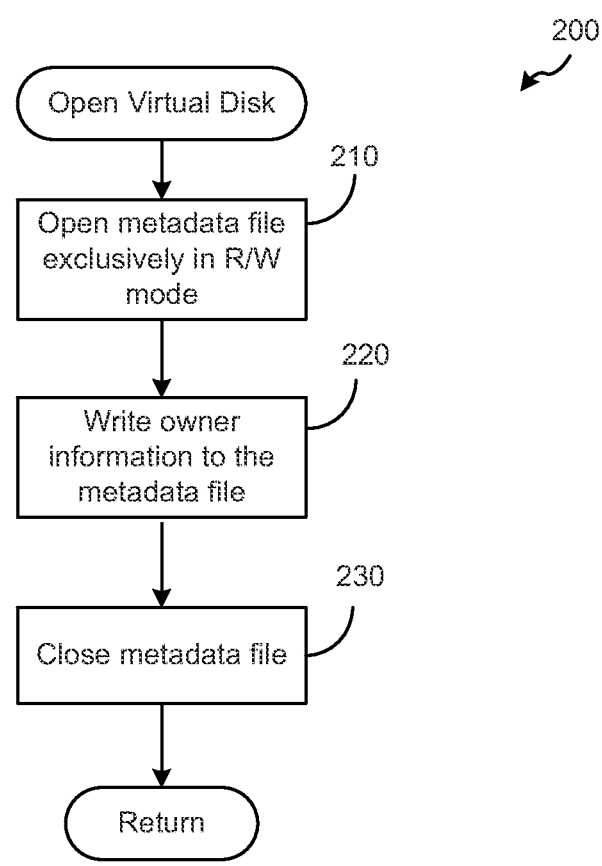
FIG. 2 is a flow diagram that illustrates a method of opening a virtual disk and writing information to a metadata file associated with that virtual disk.

FIG. 2 is a flow diagram that illustrates a method 200 of opening a virtual disk and writing information to a metadata file associated with that virtual disk. Method 200 is executed by a virtual disk open handler, which is an application programming interface (API) exposed by hypervisor 108 to applications running on hypervisor 108. For example, when a virtual machine is powered on, a user world thread for the virtual machine, hereinafter referred to as VMX, calls this API to open the virtual disk associated with the virtual machine. The term "user world" refers to a process running in hypervisor 108.

The method 200 begins at step 210, where the virtual disk open handler, in response to an API call, exclusively opens the metadata file in read-write (R/W) mode. The method proceeds to step 220 where the virtual disk open handler writes information identifying the owner, e.g., host IP address of the owner and the port or local socket the owner is monitoring, in the metadata file. Writing the owner information into the metadata file occurs, for example, when a daemon needs to access the virtual disk to perform a background operation like flushing dirty data from a cache to a VMDK file. The daemon will open up the VMDK, and will instruct its own filter to stamp its metadata file with the information that will identify itself as the owner, so that the daemon can later receive a request to close the disk and release ownership. Filters only talk to their own daemon, not to any other filter's daemon. In the case of a regular virtual machine power on, the VMX is the owner, which means no particular filter can own the virtual disk. Thus, no identification information is stored in that instance, since a filter cannot close the virtual disk.

The method then proceeds to step 230 where the virtual disk open handler closes the metadata file. The owner information has been written into the metadata file, and now other applications can identify the owner of the virtual disk. In addition, the virtual disk is now exclusively opened to the owner.

If another application tries to open the virtual disk at this time, it will fail because the virtual disk is exclusively opened. However, the metadata file is closed. Therefore, other applications can determine the owner of the virtual disk by checking the metadata files using the following procedures illustrated in FIG. 3.

Figure 3:
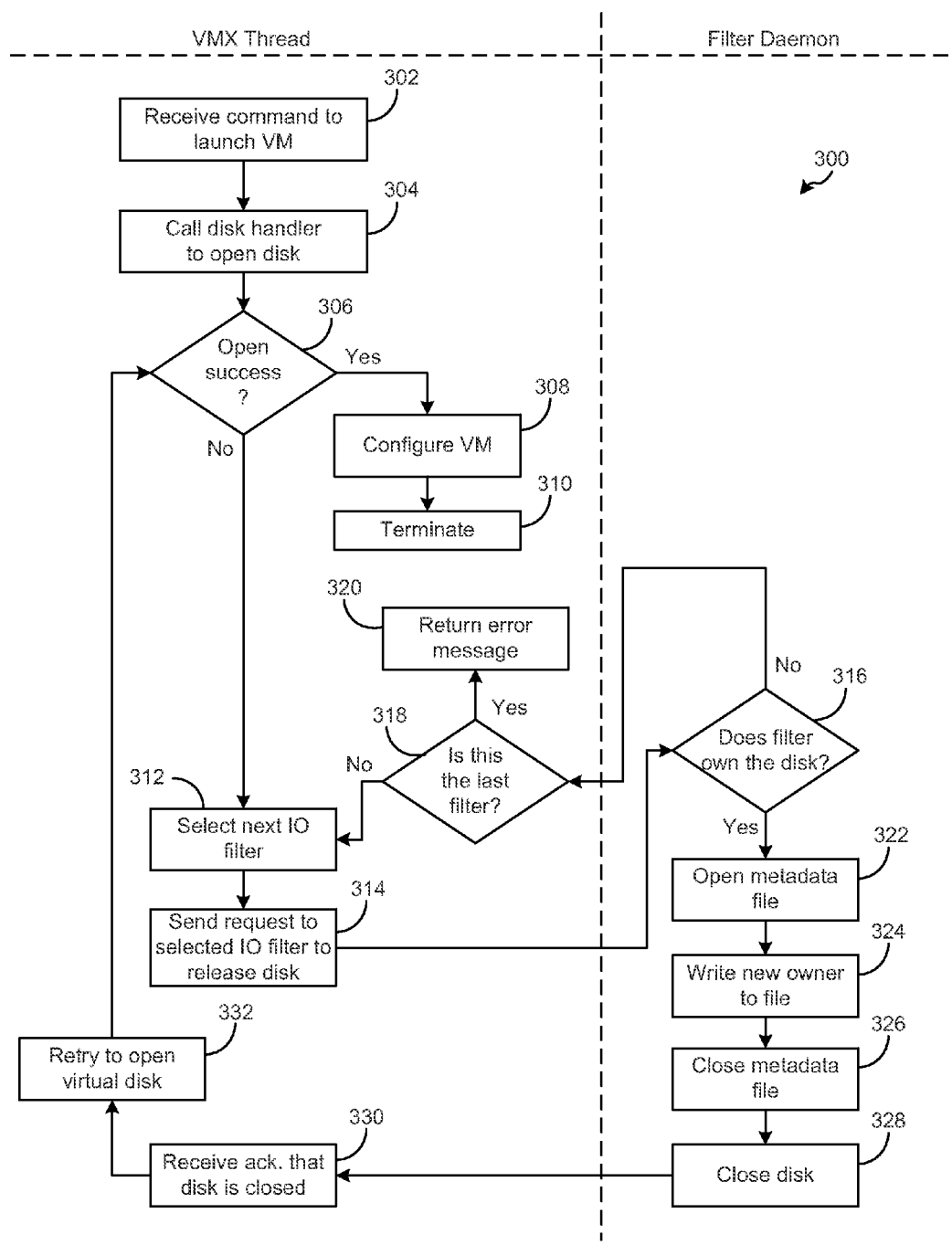
FIG. 3 is a flow diagram that illustrates a method of determining an owner of an exclusively-owned virtual disk and sending a request to that owner to close the virtual disk.

FIG. 3 is a flow diagram that illustrates a method 300 of determining an owner of an exclusively-owned virtual disk and sending a request to that owner to close the virtual disk in the context of a VMX thread that is trying to open a virtual disk associated with a VM that is being powered on. Method 300 illustrates steps 302 to 314, 318 to 320, and 330-332, which are carried out by the application that is seeking to open the virtual disk, e.g., the VMX thread, and steps 316 and 322-328, which are carried out by the filter daemons that may own the virtual disk.

The method begins at step 302, where in response to a request to power on a virtual machine, the VMX thread is launched. Method 300 continues at step 304, where the VMX thread calls a virtual disk handler to open a virtual disk associated with a virtual machine. As shown in decision block 306, if the virtual disk is opened successfully, the method moves to step 308, wherein the VMX configures the virtual machine for use. At step 310, the method ends.

If the open command was not successful in decision block 306, the method proceeds to step 312. At step 312, the VMX thread begins the process of selecting the IO filters in succession until the filter that owns the virtual disk is discovered. At step 312, the VMX thread selects the next IO filter to be checked. In the first pass through the method 300, the VMX thread selects the first IO filter at step 312.

At step 314, the VMX thread sends a request to the selected IO filter to release the virtual disk. The process proceeds to decision block 316, where the daemon for the selected IO filter determines if this filter owns the disk. If this filter does not own the disk, the VMX thread then checks to see if this is the last filter at step 318 (i.e., all filters have been checked). If this is the last filter, and the disk has not been successfully opened, an error message is returned in step 320. If the result of step 318 is that this is not the last filter, the VMX thread selects the next IO filter in step 312 to see if that filter owns the disk, and the process continues.

If, at decision block 316, the filter verifies that its daemon does own the disk, the process proceeds to step 322 where the daemon associated with the filter begins the process to close the virtual disk. In some implementations the current owner of the disk may evaluate the request to close the disk and make a yes or no decision on whether to close the disk. This decision could be based on, for example, a priority of tasks being performed by the current owner compared to the priority of the requesting entity. Other criteria could also be used to make this decision. In this example embodiment, however, the current owner will close the disk upon receiving the request.

At step 322, the daemon opens the metadata file that stores the current owner information in exclusive read/write mode. At step 324, the daemon writes the new owner information to the metadata file. Alternatively, the daemon may clear the owner information in the metadata file without writing information identifying the new owner and may also indicate that transfer to the new owner is pending. At step 326, the daemon closes the metadata file, which now stores the new owner information. At step 328, the daemon closes the virtual disk.

Control of the virtual disk is now relinquished to the new owner. At step 330, the new owner (or VMX thread, in this example) receives an acknowledgement that the virtual disk has been closed. The new owner can then reattempt to open the virtual disk as shown at step 332. The method 300 then returns to step 306 to determine if the open is successful. If the open is not successful, the process of contacting the current owner of the virtual disk and requesting release of the virtual disk may be repeated.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. These embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A non-transitory computer readable medium comprising instructions that are executed in a computer system to carry out a method for releasing a virtual disk, said method comprising:
    reading information from a metadata file that identifies a current owner of the virtual disk;
    sending a release request to the current owner of the virtual disk to release the virtual disk wherein the virtual disk is associated with one or more IO filters that are configured to intercept and modify virtual machine requests directed to the virtual disk, and the release request is sent to a first filter;
    writing information to the metadata file identifying the new owner; and
    opening the virtual disk.

2. The non-transitory computer-readable medium of claim 1, wherein the release request sent to the first filter is unsuccessful, and a subsequent release request is sent to another filter.

3. The non-transitory computer-readable medium of claim 1, wherein the first filter communicates with a daemon associated with the first filter to close the virtual disk.

4. The non-transitory computer-readable medium of claim 3, wherein the first filter writes information to the metadata file identifying the new owner after the daemon closes the virtual disk.

5. The non-transitory computer-readable medium of claim 1, wherein the current owner writes the information to the metadata file identifying the new owner.

6. The non-transitory computer-readable medium of claim 1, wherein, to release the virtual disk, the current owner opens the metadata file in exclusive read-write mode, writes information to the metadata file identifying the new owner, and closes the metadata file.

7. A method for releasing a virtual disk, comprising:
    reading information from a metadata file that identifies a current owner of the virtual disk;
    sending a release request to the current owner of the virtual disk to release the virtual disk wherein the virtual disk is associated with one or more IO filters that are configured to intercept and modify virtual machine requests directed to the virtual disk, and the release request is sent to a first filter;
    writing information to the metadata file identifying the new owner; and
    opening the virtual disk.

8. The method of claim 7, wherein the release request sent to the first filter is unsuccessful, and a subsequent release request is sent to another filter.

9. The method of claim 7, wherein the first filter communicates with a daemon associated with the first filter to close the virtual disk.

10. The method of claim 9, wherein the first filter writes information to the metadata file identifying the new owner after the daemon closes the virtual disk.

11. The method of claim 7, wherein the current owner writes the information to the metadata file identifying the new owner.

12. The method of claim 7, wherein, to release the virtual disk, the current owner opens the metadata file in exclusive read-write mode, writes information to the metadata file identifying the new owner, and closes the metadata file.

13. An apparatus, comprising:
    a processing unit; and
    a memory coupled to the processing unit, the memory storing instructions which, when executed by the processing unit, cause the processing unit to:
    read information from a metadata file that identifies a current owner of the virtual disk;
    send a release request to the current owner of the virtual disk to release the virtual disk wherein the virtual disk is associated with one or more IO filters that are configured to intercept and modify virtual machine requests directed to the virtual disk, and the release request is sent to a first filter;
    write information to the metadata file identifying the new owner; and
    open the virtual disk.

14. The apparatus of claim 13, wherein the release request sent to the first filter is unsuccessful, and a subsequent release request is sent to another filter.

15. The apparatus of claim 13, wherein the first filter communicates with a daemon associated with the first filter to close the virtual disk.

16. The apparatus of claim 15, wherein the first filter writes information to the metadata file identifying the new owner after the daemon closes the virtual disk.

17. The apparatus of claim 13, wherein the current owner writes the information to the metadata file identifying the new owner.

18. The apparatus of claim 13, wherein, to release the virtual disk, the current owner opens the metadata file in exclusive read-write mode, writes information to the metadata file identifying the new owner, and closes the metadata file.

* * * * *